H. T. D'ALBERT.
PRINT CONVEYING CONDUIT FOR CAMERAS.
APPLICATION FILED JULY 28, 1917.

1,358,622.

Patented Nov. 9, 1920.

Inventor
Henry T. d'Albert.

UNITED STATES PATENT OFFICE.

HENRY T. D'ALBERT, OF ARLINGTON, VIRGINIA, ASSIGNOR TO GRANT LEET, OF WASHINGTON, DISTRICT OF COLUMBIA.

PRINT-CONVEYING CONDUIT FOR CAMERAS.

1,358,622. Specification of Letters Patent. Patented Nov. 9, 1920.

Application filed July 28, 1917. Serial No. 183,359.

*To all whom it may concern:*

Be it known that I, HENRY T. D'ALBERT, a citizen of the United States, residing at Arlington, in the county of Alexandria and State of Virginia, have invented certain new and useful Improvements in Print-Conveying Conduits for Cameras, of which the following is a specification.

My invention relates to carrying conduits for photographic cameras and comprises a carrying conduit adapted to take the sheets or films from a photographic copying camera or other similar apparatus to a dark-box, receptacle, or other such place where they may be stored pending further treatment, as may be desired. The conduit is provided with a suitable conveyer mechanism to carry the exposed photographic paper or films from the camera to the receptacle. The primary object of my invention is to enable the operator to obtain the maximum number of exposures from the camera by avoiding any delay incident to having the prints developed in the camera itself.

In the accompanying drawings:—

Figure 1 is a view partly in side elevation and partly in section illustrating the device embodying the present invention, Fig. 2 is a top plan view of the device, the camera being removed, Fig. 3 is a vertical longitudinal sectional view through the receiving end of the conduit.

Fig. 4 is a vertical longitudinal sectional view illustrating a modification of the invention.

The numeral 1 represents an ordinary type of photographic copying machine and the numeral 2 indicates my improved light-tight carrier, it having the two sets of carrier tapes 3 and 4 arranged to travel therein over rollers 5, 6, 7, 8 and 9. Rollers 5 and 6 have gears 26 and 27 thereon for imparting motion from roller 5 to roller 6. The inner leads of the tapes consequently travel together, and are adapted to receive sheets therebetween and carry them from one end of the carrier to the other, as shown in Fig. 1.

The tapes are driven in any approved manner, but preferably through a sprocket-wheel 10 on shaft 5 and chain 11 extending to a sprocket-wheel 12, which latter is turned by a crank or other means 13. Guide fingers 14 direct the sheets as they are severed from the roll by the usual cutter 15 between the forward ends of the carrier tapes 3 and 4 whence they are conducted through the carrier, and expelled at the outer end between rollers 7 and 9 over a curved guide 16 into the dry-box 17 or other receptacle, as the case may be.

The top of the dry-box 17 is connected to the bottom by hinge 17', so that it may be opened at any time to gain access to the interior, and the entire top 2' of the carrier is capable of being removed at any time in order to get to the parts within.

Referring to Fig. 1, the crank 23, ratchet 24 and pawl 25 provide for the independent operation of the carrier, so that the exposed portion of the roll or cut sheets may be carried to the place of discharge after the severance of the last exposed sheet, without disturbing the unexposed portion remaining in the photo-copying machine. This crank 23 is secured to shaft 5 as well as to a ratchet-wheel 24, which engages with spring pawl 25 on the outside of the sprocket 10, which imparts motion to shaft 5 when carrier is operated by the photo-copying machine.

The pawl 25 and ratchet 24 admit of the sprocket 10 turning when driven by sprocket-chain 11, and of the rollers 5 and 6 being driven independently thereof.

In Fig. 3, the carrier is shown as leading directly to a receptacle 28, and in connection with this a dark-box 29 is removably attached to receive the sheets from the receptacle. To remove these sheets from the receptacle 28 and place them in the dark box 29, an orifice 30 is provided in the side of the receptacle, and this is protected by means of a sleeve 31, which hangs over the orifice 30, in the outer end of which sleeve the operator first inserts his hand, and thence through the orifice 30, thus preventing the light from entering the receptacle and the sheets from becoming light-struck.

In the feeding of the sheets, the feed of the sheets from the photo-copying machine or other photographic apparatus is slightly greater than the feed of the belts in the carrier; and, furthermore, since the sheets come from a roll, they are slightly curved, and as they enter the throat of the carrier their upper ends are held forward by the deflecting hump 33 in the guide-fingers, so that the lower edge of the next following sheet underlaps the upper edge of the preceding sheet for a short distance, and in this condition they are carried through the carrier and ejected therefrom or are finally discharged over the curved guide 16 in the dark-box, or other receptacle, as shown in Fig. 1.

The carrier and storage receptacle increases the capacity of the camera approximately ten times or 1000 per cent. by reason of the fact that with development carried on in the photographic copying machine the exposed sheet must be retained in the developer until development is complete (usually from thirty seconds to one minute) and subsequently exposed sheets cannot be passed into the developer until the previous one is removed therefrom, whereas by means of the carrier and receptacle the exposed sheets or films are automatically removed as rapidly as exposures can be made which is normally from three to five seconds.

I claim:

1. A device for transferring sensitized photographic media, said device comprising an elongated conduit closed to actinic light rays and provided at one end with a passage-way through which the media may be introduced into the conduit, a receptacle at the other end of the conduit, and upper and lower endless conveyer belts operating within the conduit lengthwise thereof to carry the media between their adjacent stretches from the receiving end of the conduit to the said receptacle.

2. A device for transferring sensitized photographic media, said device comprising a conduit closed to actinic light and arranged at one end to receive the media from an exposure apparatus and at its other end to discharge into a receptacle, and upper and lower conveyer belts operating longitudinally in the conduit and having their adjacent stretches juxtapositioned to receive the media between them and frictionally engage the same to carry it through the conduit in the operation of the belts.

3. The combination with an exposure apparatus, and means operable to deliver therefrom photographic media exposed thereby, of an actinic light-ray-excluding conduit leading from the apparatus and in communication therewith to receive the exposed media, means for conducting the media through the conduit, means operatively connecting the delivering means and the conducting means and providing for operation of the latter, and means whereby the conducting means may be operated independently of the delivering means.

4. A device for transferring sensitized photographic media comprising an actinic light-ray-excluding conduit to receive the sensitized media, an actinic light-ray-excluding receptacle separably connected with the conduit and into which the exposed media may be placed upon removal from the conduit, the conduit having a hand opening, and means providing against passage of light rays through said opening.

5. The combination with an exposure apparatus embodying means for delivering therefrom sensitized media exposed thereby, of means operable to conduct the delivered media from the apparatus, means for operating the conducting means in consonance with and at a slower speed than the delivering means, whereby the media will be caused to overlap, and means coacting with the conducting means to assemble the media in overlapped relation.

6. A device for transferring exposed sensitized photographic media from an exposure apparatus to a receptacle, said device comprising a conduit closed to actinic light rays and arranged at one end to deliver the media, the conduit being provided at its other end with an opening to receive the media delivered from the exposure apparatus, and means operating within the conduit to engage the media as delivered through the opening and to conduct the same through the conduit and discharge it from the first mentioned end of the conduit.

In testimony whereof I affix my signature.

HENRY T. D'ALBERT.